T. B. ROGERS.
Cultivator.
No. 63,430.
Patented Apr. 2, 1867.
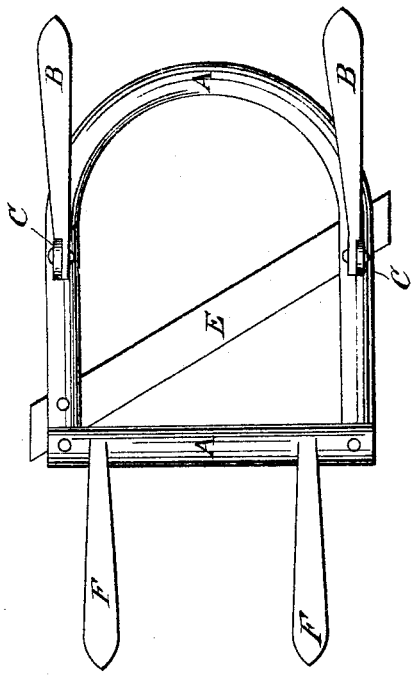
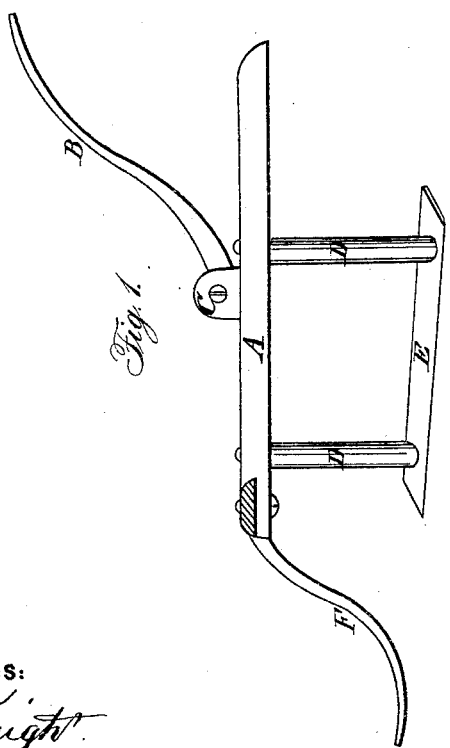
Witnesses:
Inventor:

United States Patent Office.

THEODORE B. ROGERS, OF WEATHERSFIELD, CONNECTICUT.

Letters Patent No. 63,430, dated April 2, 1867.

---

IMPROVEMENT IN CULTIVATORS.

---

*The Schedule referred to in these Letters Patent and making part of the same.*

---

TO ALL WHOM IT MAY CONCERN:

Be it known that I, THEODORE B. ROGERS, of Weathersfield, county of Hartford, and State of Connecticut, have invented certain new and useful Improvement in Cultivators; and to enable others skilled to make and use the same, I will proceed to describe, referring to the drawing, in which the same letters indicate like parts in each of the figures.

The nature of this invention consists of a framework having two sides and one end straight, and one end curved or round form, the pieces or material of which this frame is constructed being of a curved or circular shape. This frame may be made, if desirable, of other shape and proportion. To the upper side of this frame, and just forward of the circular end, are provided two flanges, or in place of which, in practical use, or in the manufacture, may be made openings in the form of a socket, to receive the ends of the handles. These handles are secured to the framework by means of bolts, which pass through the handle and the flanges, or by inserting the end of the handle into properly-formed sockets. These handles are made, or designed to be made, in the manufacture, much in the shape of plough handles. The office of these handles is to hold and operate the instrument. From the under side of this frame are provided two posts or arms, extending downward, and standing in an angle of about forty-five degrees in relation to each other. To the lower ends of these arms or posts is secured a cutter-blade by means of screws or bolts. This blade is ground to an edge; the object of which is, that while it is being drawn or pushed along under the top soil, it will cut the roots of weeds, &c., from the main stalk and leave them prostrate and withering upon the ground, without covering them, as in the usual way in turning the soil, thereby nourish them to a new growth. To the front end of this frame are secured bearers, the form and position of which will be understood from the drawings. The object of these bearers is to rest upon and slide over the ground, to support the machine, and to enable the operator to regulate the depth which the blade shall be allowed to pass under the ground or top soil, all of which will be more clearly seen by reference to the drawings, in which—

Figure 1 is a side elevation.

Figure 2 is a top or plan view.

A is the framework of the machine. B are the handles. C are flanges or their equivalents, by means of which the handles B are secured to the framework A. D are posts or arms, extending down from the under side of the framework in position thereon relative to each other of about an angle of forty-five degrees. E is a thin, narrow blade, which is ground to an edge; this blade is secured to the lower end of the arms or posts by screws or bolts. F are bearers, secured to the cross-piece or front end of the frame, the shape and position of which will be fully understood from the drawings; the object of which is to govern the depth which it is desirable the blade shall work under the top of the ground. The advantage of this invention must, it would seem, be clearly perceptible. It cuts the roots of the growing weeds just below the top of the ground, and leaves them exposed to wilt and die. I have thus endeavored to show the nature, construction, and advantage of this improvement, so as to enable a person skilled to make and use the same therefrom.

What I claim, and desire to secure by Letters Patent, is—

The frame A, arms B, posts D, in combination with the blade E and bearers F, substantially as and for the purpose described.

THEODORE B. ROGERS. [L. S.]

Witnesses:
 THOS. G. KNIGHT,
 JEREMY W. BLISS.